United States Patent [19]

Okita et al.

[11] 3,800,327

[45] Mar. 26, 1974

[54] MAGNETIC RECORDING AND REPRODUCING APPARATUS WITH ERASING HEAD AND A TAPE GUIDE MOUNTED ON A MOVABLE CARRIAGE

[75] Inventors: Shin Okita, Saitama; Masaru Nakakita, Tokyo, both of Japan

[73] Assignee: Sony Corporation, Tokyo, Japan

[22] Filed: July 3, 1972

[21] Appl. No.: 268,610

[30] Foreign Application Priority Data

July 10, 1971 Japan .......................... 46-60665[U]

[52] U.S. Cl. ........... 360/105, 360/118, 242/55.19 A

[51] Int. Cl.. G11b 15/29, G11b 15/04, G11b 23/04

[58] Field of Search ............ 179/100.2 CA, 100.2 Z, 179/100.2 D; 346/74 MC; 340/174.1 F; 242/55.19 A; 274/4 E

[56] References Cited

UNITED STATES PATENTS

| | | | |
|---|---|---|---|
| 3,531,575 | 9/1970 | Kobler et al. | 179/100.2 CA |
| 3,672,685 | 6/1972 | Tolar | 179/100.2 CA |
| 3,452,358 | 6/1969 | Zehner | 346/74 MC |
| 3,548,113 | 12/1970 | Althuber | 179/100.2 D |
| 3,571,524 | 3/1971 | Kozu et al. | 179/100.2 CA |
| 3,669,457 | 6/1972 | Nozawa et al. | 179/100.2 Z |

*Primary Examiner*—Daryl W. Cook
*Assistant Examiner*—Alfred H. Eddleman
*Attorney, Agent, or Firm*—Lewis H. Eslinger, Esq.; Alvin Sinderbrand, Esq.

[57] ABSTRACT

An apparatus for recording and reproducing signals on a magnetic tape, preferably contained in a cassette, has magnetic recording and reproducing head means,a permanently magnetized erasing head and a tape guide all mounted on a carriage which is movable, upon selection of a recording or reproducing operation of the apparatus, from an inoperative position, in which the apparatus is adapted to receive the cassette or other tape supply, to an operative position at which the recording and reproducing head means and the tape guide are engaged with the tape, and the erasing head is movable with respect to the carriage to also engage the tape when the recording mode of operation is selected and to be spaced from the tape, for avoiding the erasing of signals therefrom, when the reproducing mode of operation is selected.

23 Claims, 11 Drawing Figures

MAGNETIC RECORDING AND REPRODUCING APPARATUS WITH ERASING HEAD AND A TAPE GUIDE MOUNTED ON A MOVABLE CARRIAGE

This invention relates generally to an apparatus for magnetically recording and reproducing signals on a magnetic tape, and more particularly is directed to improvements in apparatus of that type in which a permanently magnetized erasing head is used for removing previously recorded signals from the tape prior to the recording thereon of new signals.

A permanently magnetized erasing head for a magnetic recording and reproducing apparatus has the advantage of being relatively less costly than electromagnetic erasing heads and the respective energizing circuits. However, the permanently magnetized erasing head must be mounted for movement from an operative position, in which the erasing head is effective to remove signals previously recorded on the tape moving therepast, to an inoperative position, in which the permanently magnetized erasing head is disposed away from the tape path or otherwise arranged to avoid erasing of signals recorded on the tape, for example, as during the reproducing mode of operation of the apparatus. Various arrangements have been proposed, for example, in Japanese Utility Model Publications No. 38-27360, No. 39-22245, No. 41-22607 and No. 45-10767, in which a permanently magnetized erasing head is movably mounted, as aforesaid. However, the previously proposed arrangements employing a permanently magnetized erasing head are not ideally suited or adapted for use in apparatus for recording and reproducing signals on a magnetic tape contained in a cassette. More particularly, such previously proposed arrangements employing a permanently magnetized erasing head do not provide a tape guide for stabilizing the movement of the tape immediately adjacent the erasing head. The absence of a tape guide adjacent the erasing head is particularly disadvantageous in the case of an apparatus of the type intended for use with tape cassettes by reason of the fact that, in such apparatus, the tape supply reel is loosely positioned within the cassette and is only loosely coupled with the respective reel shaft of the apparatus. Accordingly, during the movement or transport of the tape from the supply reel to the takeup reel within the cassette housing, for example, during the recording or reproducing mode of operation of the apparatus, the supply reel can oscillate or vibrate both axially and in a radial direction with the result that the run of the tape extending between the reels, and which is to be engaged by the recording and reproducing head or heads and also by the erasing head, has oscillations and/or undulations or waves imparted thereto. Such oscillations or undulations imparted to the run of the tape moving between the supply and takeup reels obviously having a deleterious effect upon the actions of the recording and reproducing head or heads and of the erasing head.

Accordingly, it is an object of this invention to provide a magnetic tape recording and reproducing apparatus in which the cost-saving advantages of a permanently magnetized erasing head are realized while stabilizing the movement of the tape during the recording and reproducing modes of operation.

Another object is to provide a magnetic tape recording and reproducing apparatus with a permanently magnetized erasing head which is associated with a tape guide in a relatively simple and low-cost assembly.

A further object is to provide an apparatus, as aforesaid, which is particularly suited for use with tape cassettes.

Still another object is to provide an apparatus, as aforesaid, in which the movement of the permanently magnetized erasing head between its operative and inoperative positions is simply and smoothly achieved in response to the selection of the operating mode of the apparatus.

In accordance with an aspect of this invention, a magnetic tape recording and reproducing apparatus has tape drive means for transporting a magnetic tape at least in one direction along a predetermined path, preferably within a cassette, during recording and reproducing operation of the apparatus, a carriage moved transverse to said path from an inoperative position to an operative position during the recording and reproducing operations, a magnetic recording and reproducing head or heads fixed on the carriage and engaging the tape in said path when said carriage is in said operative position, tape guide means fixed on said carriage and also engaging the tape in said path when said carriage is in said operative position for stabilizing the transport of the tape by said drive means, permanently magnetized erasing head means disposed adjacent said tape guide means on the carriage in advance of the recording and reproducing head considered in said one direction of tape transport, means mounting said erasing head means for movement relative to said tape guide means between a first position in which, with the carriage in its operative position, said erasing head means contacts the tape in said path for erasing signals recorded on said tape, and a second position in which, with said carriage in its operative position, said erasing head means is spaced from said path in the direction toward said inoperative position of the carriage, and control means for said erasing head means disposing the latter in said first position during said recording operation of the apparatus and disposing said erasing head means in said second position during said reproducing operation of the apparatus.

The above, and other objects, features and advantages of the invention, will be apparent in the following detailed description of illustrative embodiments which is to be read in connection with the accompanying drawings, wherein.

Figure 1:
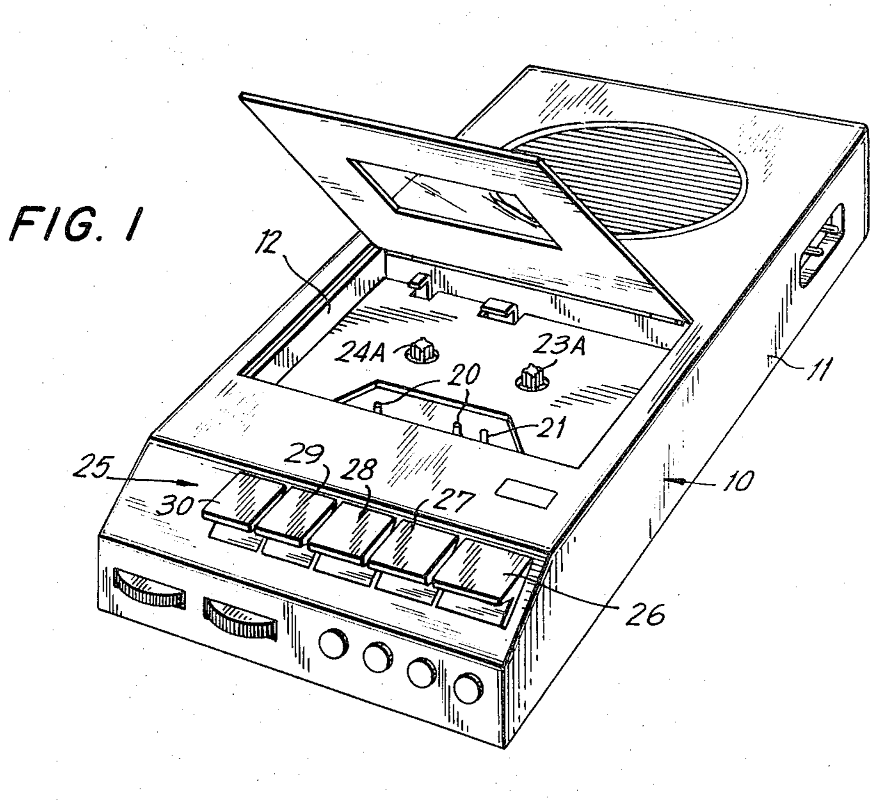
FIG. 1 is a perspective view of a magnetic recording and reproducing apparatus in accordance with an embodiment of this invention.
Figure 2:
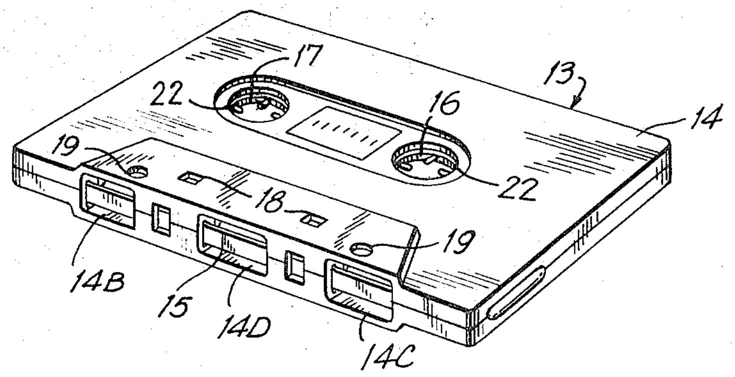
FIG. 2 is an enlarged perspective view of a standard tape cassette that can be used in the apparatus of FIG. 1.

Referring to FIG. 1 in detail, it will be seen that a magnetic recording and reproducing apparatus 10 according to this invention may have a casing 11 provided with a recess or cavity 12 defining a holder for receiving and positioning a tape cassette 13 of the type shown on FIG. 2. The cassette 13 is shown to include a housing 14 containing a magnetic tape 15 which is wound on reels 16 and 17 that are loosely guided for rotation within the housing. As is usually the case, the opposite ends of tape 15 may be secured to reels 16 and 17, respectively, and the tape extending between the reels is directed by guides 14A within cassette housing 14 so as to travel in a path extending along the front edge wall of cassette housing 14 for exposure at openings or windows 14B, 14C and 14D provided in such front edge wall of the cassette housing. The illustrated cassette housing 14 is further shown to have inner partitions 14E, 14F and 14G which respectively span the windows 14B, 14C and 14D and which have forwardly directed end portions to guide the tape 15 between such end portions and the front edge wall of housing 14. The top and bottom walls of cassette housing 14 are shown to be provided, adjacent the front edge of the housing, with the usual pair of laterally spaced openings 18 and a pair of further laterally spaced apart openings 19. When the cassette 13 is disposed in cavity 12 of casing 11, locating pins 20 projecting upwardly within such cavity are received in openings 18 of the cassette for precisely locating the latter and a captsan 21, also projecting upwardly within cavity 12, extends into one or the other of the openings 19 of the cassette and thus is disposed adjacent the run of magnetic tape 15 passing one of the windows 14B and 14D provided in the front edge wall of cassette housing 14. The top and bottom walls of cassette housing 14 are further shown to have the usual openings 22 registering with internally splined hubs of reels 16 and 17 so that, when the cassette is disposed in cavity 12, such internally splined hubs of the reels can loosely receive and be rotatably coupled with the similarly splined rotatable reel drive shafts 23A and 24A of reel support members 23 and 24 which project upwardly into cavity 12.

The apparatus 10 is further shown to have a control assembly 25 that includes pushbuttons 26, 27, 28, 29 and 30 that are manually actuable to select respective operating modes of apparatus 10. For example, when a cassette 13 is located within cavity 12, manual depressing of pushbutton 28 may be made effective to cause the normal or relatively slow speed advancement of the tape 15 in the forward direction, that is, in the direction unwinding the tape from supply reel 17 and winding up the tape on take-up reel 16, as during the playback or reproducing of signals previously recorded on the tape, or during the recording of signals on the tape, which recording mode of operation may be achieved by the simultaneous actuation of pushbutton 26 with pushbutton 28. Similarly, pushbuttons 27 and 30 may be made effective to control the fast forward movement and fast rewinding, respectively, of the tape, whereas the pushbutton 29 may be employed for halting the tape drive at any desired time during any of the selected operating modes of apparatus 10.

Figure 3:
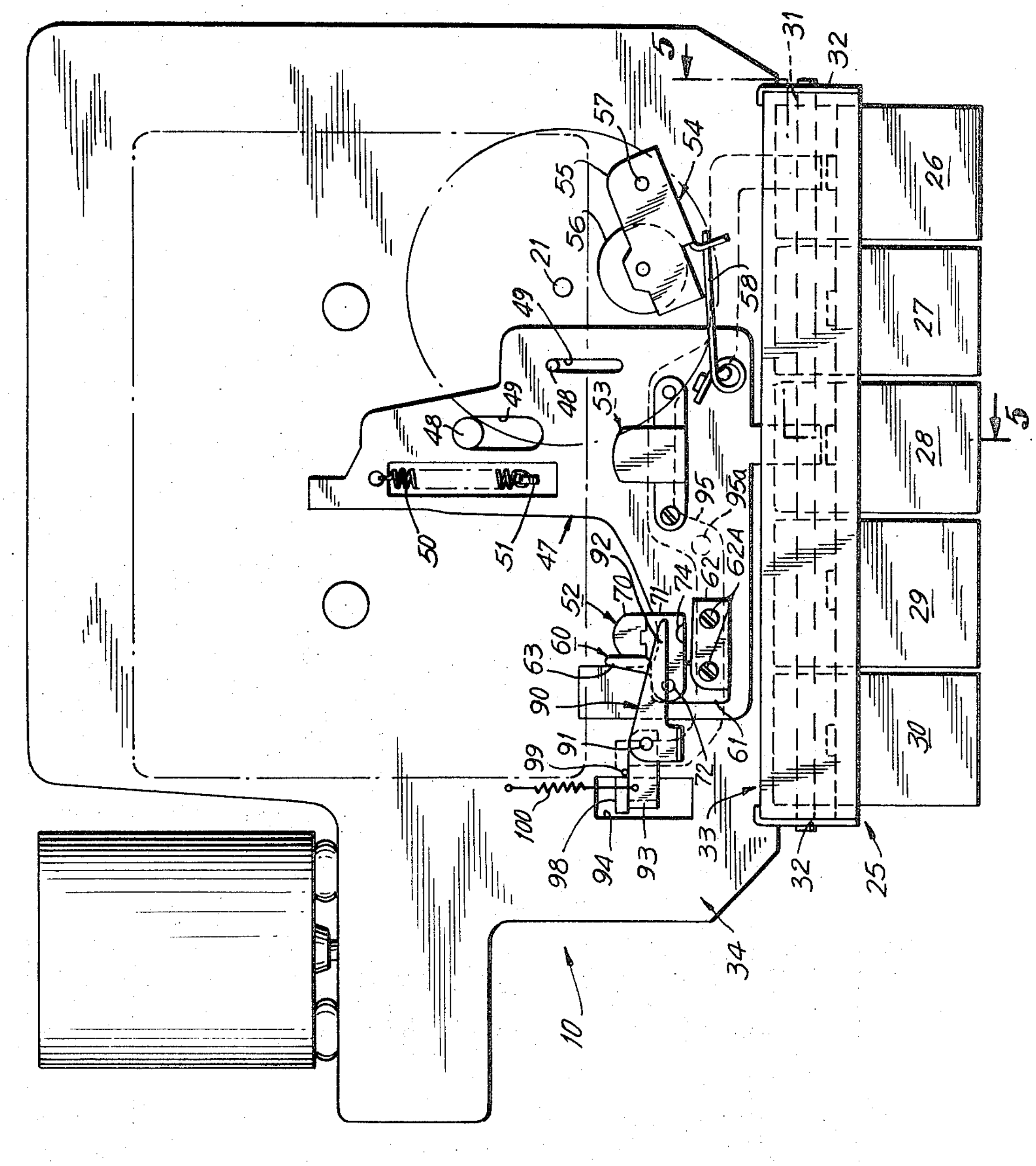
FIG. 3 is an enlarged top plan view of the apparatus of FIG. 1 shown with its casing removed and with its head-carrying carriage in its inoperative position.
Figure 4:
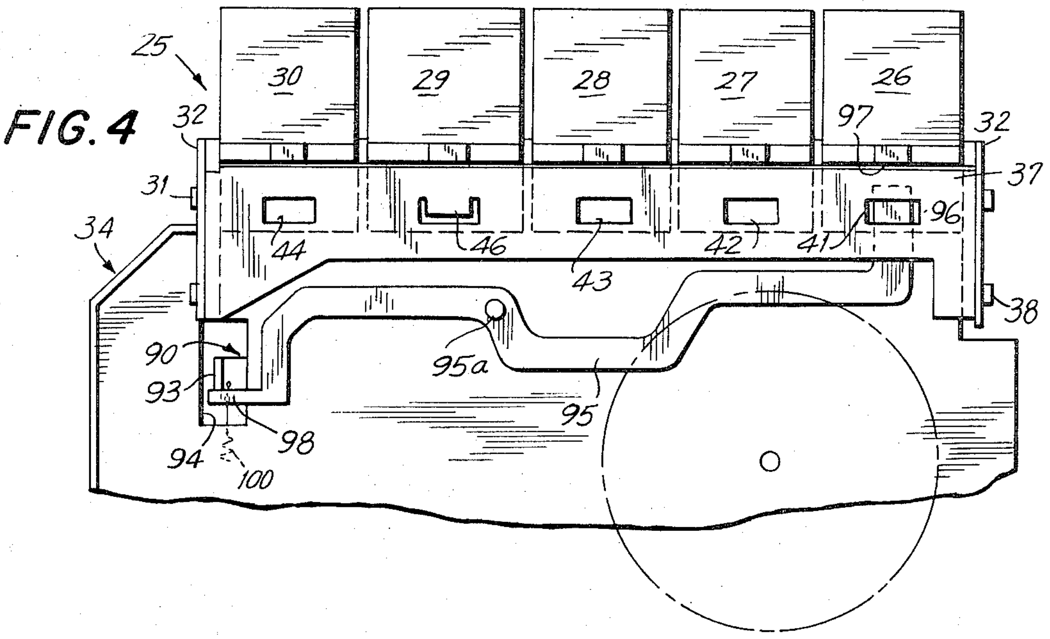
FIG. 4 is a partial bottom plan view of the front portion of the apparatus of FIG. 3 particularly showing the mechanism for controlling the erasing head position.
Figure 5:
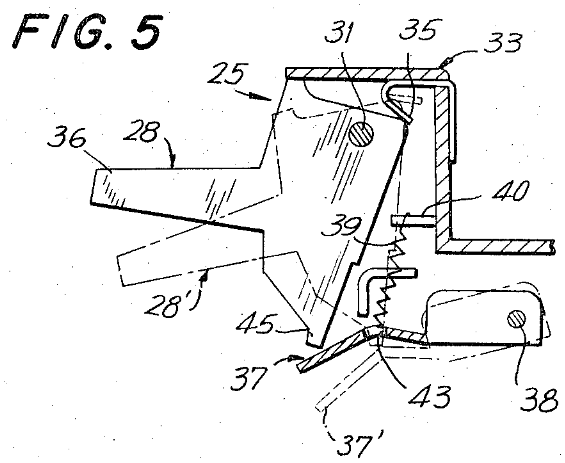
FIG. 5 is a fragmentary sectional view taken along the line 5—5 on FIG. 3.

Referring to FIGS. 3, 4 and 5, it will be seen that the mode-selecting pushbuttons 26–30 are pivotally mounted side-by-side on a shaft 31 which is supported, at its ends, in end walls 32 of a bracket 33 mounted at the front of a chassis plate 34. As shown on FIG. 5 with respect to pushbutton 28, a leaf spring 35 is carried by bracket 33 and engageable with the top of each of the pushbuttons 26–30 in back of the pivoting axis thereof so as to urge each of the pushbuttons to its normal inoperative position shown in full lines on FIG. 5 and in which the manually engageable, forwardly projecting portion 36 of the pushbutton is raised. The control assembly 25 is further shown to include a latch member 37 (FIGS. 4 and 5) which is pivotally mounted, at its ends, on pivot pins 38 carried by end walls 32 of bracket 33, and which extends forwardly under all of the pushbuttons 26–30 from the pivoting axis defined by pins 38. A spring 39 (FIG. 5) is connected between latch member 37 and a tab 40 provided on bracket 33 for urging latch member 37 upwardly to its latching position shown in full lines on FIG. 5. As shown particularly on FIG. 4, the latch member 37 is formed with laterally spaced apart slots or keepers 41, 42, 43 and 44 which respectively register with pushbuttons 26, 27, 28 and 30 and which are adapted to receive a latch element 45 depending from the respective pushbutton when such pushbutton is manually displaced or depressed to its operative position. It will be apparent that, as any one of the pushbuttons 26, 27, 28 and 30 is depressed or rocked to its operative position indicated in broken lines at 28′ on FIG. 5 with respect to the pushbutton 28, the respective latch element 45 rides on latch member 37 to depress the latter against the force of spring 39 until such time as the latch element 45 is received in the respective keeper slot 41–44. Thereafter, latch element 37 retains the previously depressed pushbutton in its operative position until such time as latch member 37 is rocked to its released position indicated in broken lines at 37′ on FIG. 5, whereupon any previously depressed pushbutton is free to be returned to its inoperative position by the respective spring 35.

At the location of the pushbutton 29, the latch member 37 is shown to have an upwardly inclined tab 46 struck therefrom so as to be engageable by the latch element 45 of pushbutton 29. Thus, whenever pushbutton 29 is depressed to its operative position, the element 45 thereof engages the upwardly struck tab 46 and thereby depresses latch member 37 to its released position indicated at 37′ on FIG. 5, whereby to release the latch element 45 of any one of the other pushbuttons 26, 27, 28 and 30 which had been previously retained in the operative position thereof. When pushbutton 29 is released, its respective spring 35 returns pushbutton 29 to its inoperative position and latch member 37 is restored by spring 39 to its normal position shown in full lines on FIG. 5.

Referring again to FIG. 3, it will be seen that the apparatus 10 further includes a carriage 47 which is disposed on top of chassis plate 34 and guided for forward and rearward movement with respect to the latter, as by pins 48 carried by the chassis plate and received in respective slots 49 formed in carriage 47. Carriage 47 is yieldably urged in the forward direction to an inoperative position shown on FIG. 3, as by a spring 50 connected between carriage 47 and an anchor 51 projecting upwardly from chassis plate 34. A recording and reproducing head 53 is fixed on carriage 47 so that, when a cassette 13 is disposed in cavity 12 and carriage 47 is moved rearwardly to its operative position (FIG. 8) as hereinafter described in detail, head 53 will be engageable with tape 15 exposed at window 14C and will urge the tape against the usual backup pad 14H that is spring mounted within partition 14F on the cassette housing.

Figure 8:
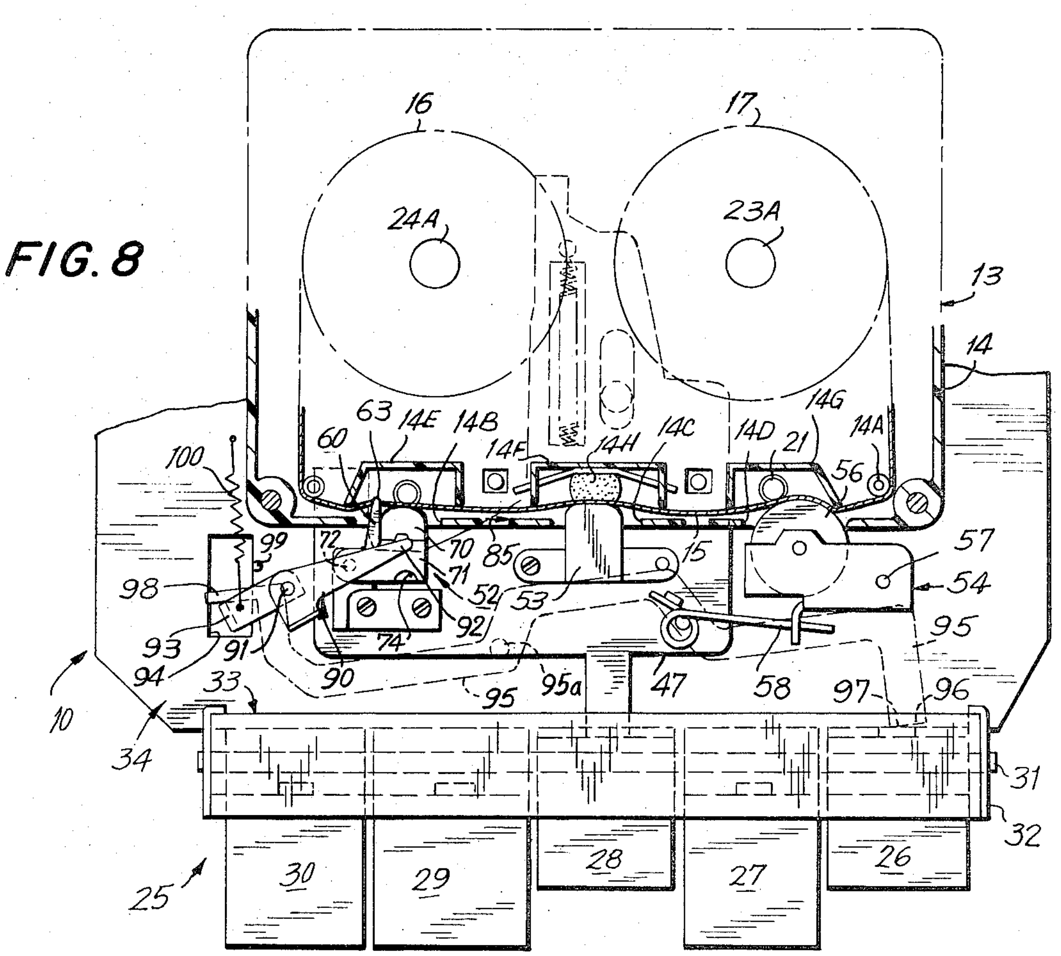
FIG. 8 is a top plan view similar to that of FIG. 3, but showing the parts thereof positioned for the recording of signals on a magnetic tape contained in a cassette which is shown in horizontal section.
Figure 10:
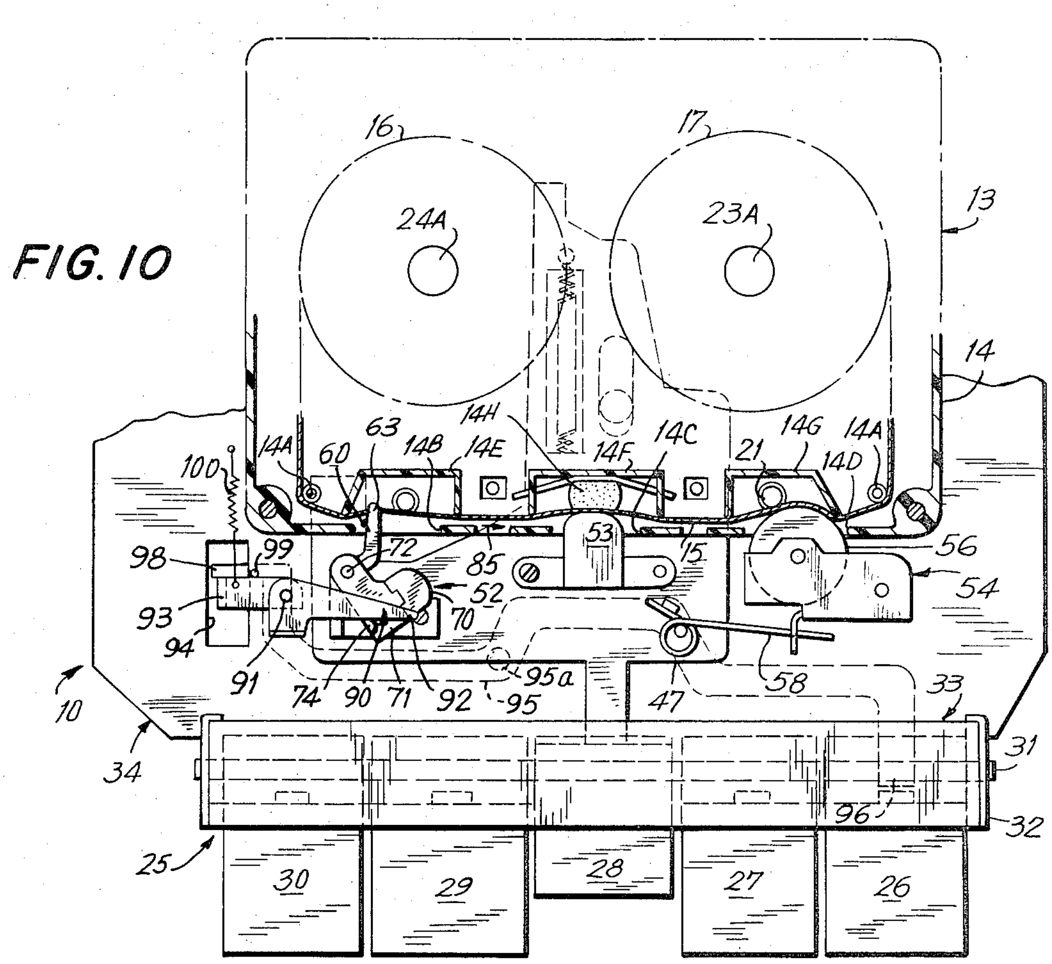
FIG. 10 is a view similar to that of FIG. 8, but showing the parts of the apparatus positioned for the reproducing mode of operation.

A pinch roller assembly 54 is provided on chassis plate 34 at one side of carriage 47 adjacent capstan 21 and includes a bracket 55 which rotatably supports a pinch roller 56 and which is pivotally mounted on a pin 57 extending from chassis plate 34 for movement of pinch roller 56 toward and away from capstan 21. A spring 58 is secured on carriage 47 and engages bracket 55 for holding pinch roller 56 away from capstan 21 when carriage 47 is in its forward, inoperative position (FIG. 3), and for swinging bracket 55 so as to press pinch roller 56 against capstan 21 when carriage 47 is displaced rearwardly to its operative position (FIGS. 8 and 10). It will be apparent that when a cassette 13 is positioned in cavity 12 and carriage 47 is moved to its operative position, the pinch roller 56 moves into the window of the cassette housing which is adjacent to capstan 21, for example, into window 14D, so that the tape will be engaged between capstan 21 and pinch roller 56 and advanced thereby in response to rotation of the capstan.

In accordance with this invention, carriage 47 further supports an assembly 60 comprised of erasing head means 52 and a bracket 61 defining a tape guide 63. The bracket 61, which may be economically molded of a suitable plastic, is shown to have a laterally extending bottom flange or base 62 secured, as by screws 62A, to carriage 47 and a rearwardly directed, generally Z-shaped arm 64 extending from the outer end of flange 62 and terminating in the tape guide 63. The tape guide 63 is shown to include a tape contact surface 63*c* at the back end of arm 64 which extends vertically, that is, across the path of the tape running along the front edge wall of cassette 13. The tape contact surface 63*c* is bounded, at its upper and lower ends, by projections 63*a* and 63*b* which extend rearwardly beyond surface 63*c* and are spaced apart by a distance only slightly greater than the width of tape 15. Further, the tape contact surface 63*c* may be either flat, or part-cylindrical so as to have a straight generatrix extending across the tape.

It will be apparent that, when carriage 47 is moved rearwardly to its operative position (FIGS. 8 and 10), arm 64 is extended into window 14B of the cassette to engage the tape 15 with surface 14*c* between projections 14*a* and 14*b*. Conversely, when carriage 47 is returned by spring 50 to its inoperative position (FIG. 3), arm 64 is withdrawn from window 14B to avoid interference with replacement of the cassette.

Figure 6:
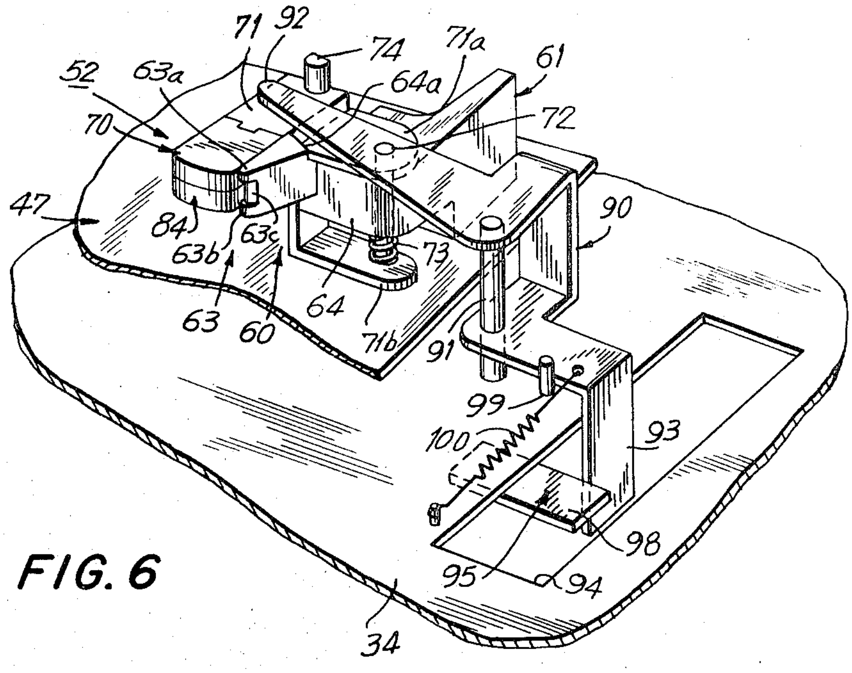
FIG. 6 is an enlarged perspective view showing the assembly of an erasing head and tape guide in the apparatus of FIGS. 3–5.
Figure 9:
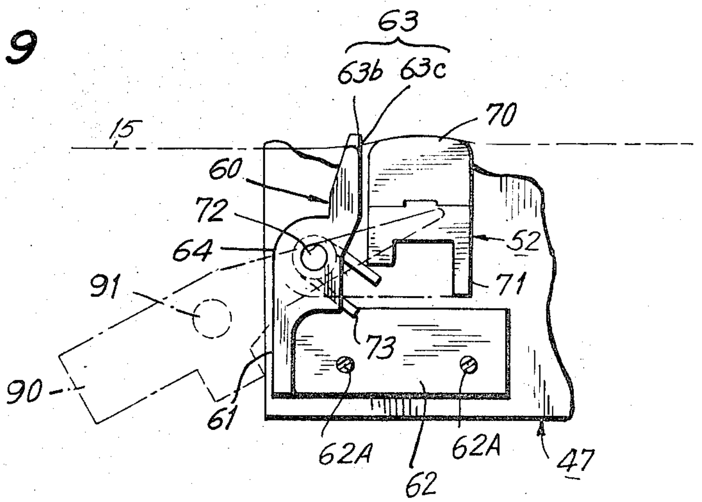
FIG. 9 is a horizontal sectional view of erasing head and tape guide assembly of FIG. 6.

The erasing head means 52 of assembly 60 is shown to include a permanently magnetized erasing head 70 and an erasing head holder 71 which may be conveniently molded of a suitable plastic and to which head 70 is suitably secured. Holder 71 is shown to have spaced apart upper and lower arms 71*a* and 71*b* directed laterally therefrom and respectively extending above and below arm 64 where arms 71*a* and 71*b* are pivoted on a pin 72 carried by arm 64. A torsion spring 73 (FIGS. 6 and 9) is provided on pin 72 and has its ends respectively engaged with bracket 61 and holder 71 for urging the latter to a first position shown on FIGS. 3, 6, 8 and 9 in which an edge of arm 71*a* abuts against a stop surface 64*a* on bracket arm 64 and the tape contact surface 84 of erasing head 70 extends rearwardly at least as far as the tape contact surface 63*c* of guide 63. However, holder 71 is turntable about pin 72 in the clockwise direction from the position shown on FIG. 9, that is, against the force of spring 73, for example, to a second position shown on FIG. 10 and in which the erasing head 70 is spaced forwardly a substantial distance from the path of the tape 15 in cassette 13.

Figure 7:
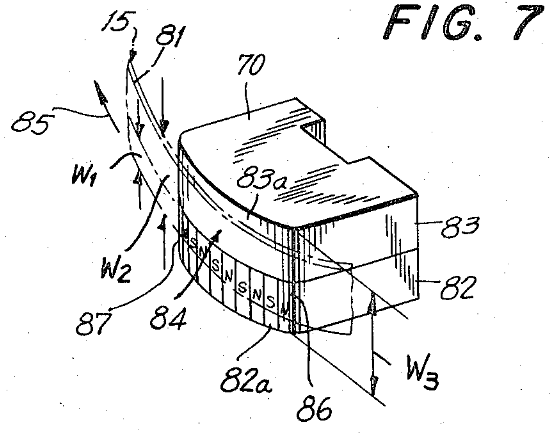
FIG. 7 is a further enlarged perspective view of the erasing head of FIG. 6.

As shown particularly on FIG. 7, the erasing head 70 may be designed to erase signals that are recorded in a track 80 extending along magnetic tape 15 and having a width $W_1$ that is only about one-half the overall width $W_2$ of the tape. In order to erase signals only from such track 80, and to leave undistributed signals recorded in a track 81 occupying the remainder of tape 15, the head 70 may comprise two united or integral ferrite layers 82 and 83 which are respectively magnetized and non-magnetic and which have exposed edge surfaces 82*a* and 83*a* combining to define the tape contact surface 84 of the head across which the tape 15 is relatively movable, for example, in the direction of the arrow 85. It will be seen that exposed edge surfaces 82*a* and 83*a* which combine to form the contact surface 84, extend generally parallel to the direction of such relative movement and each constitute only a part of the width of the contact surface considered transverse to the direction of the relative movement. The overall width $W_3$ of head 70 at its contact surface 84 is at least as large as the width $W_2$ of tape 15 so that the latter will be smoothly guided and supported by the contact surface during the relative movement of the tape and head, and the width of the exposed edge surface 82*a* of magnetized layer 82 is approximately equal to the width $W_1$ of track 80 on the tape from which signals are to be erased.

The ferrite of which the magnetized layer 82 is formed is selected so as to have a high magnetic coercive force and thus be capable of being permanently magnetized. Preferably, the magnetized layer 13 is formed of barium-ferrite or strontium-ferrite which have a magnetic coercive force of approximately 1,650 Oersted and a relatively low magnetic permeability of approximately 1.5. On the other hand, the ferrite layer 83 is selected to have a very low magnetic coercive force, and preferably also a very high magnetic permeability. The low coercive force of the ferrite selected for the layer 83 ensures that such layer will not be magnetized during magnetization of the layer 82, and the high magnetic permeability of the ferrite selected for layer 83 ensures that the latter will not only act as a guide for the tape 15 but will also act as a magnetic flux absorber. Thus, leakage magnetic flux from magnetized layer 82 will be absorbed by layer 83 and will not penetrate tape 15 at the track 81 thereof when signals are to be erased only in the track 80. Accordingly, the high magnetic permeability of the ferrite of layer 83 ensures that the magnetized layer 82 will effect erasure of signals only from the track 80 which corresponds both in position and width to the magnetized layer 82. The ferrite for forming non-magnetic layer 83 is preferably selected from zinc-ferrite, manganese-ferrite or manganese-zinc-ferrite. By way of example, it may be noted that manganese-ferrite has a coercive force of 4 Oersteds and a high magnetic permeability of 250, while manganese-zinc-ferrite has a coercive force of 0.2 Oersteds and a still higher magnetic permeability of approximately 1,500 to 2,500.

Since all of the layers 82 and 83 constituting the erasing head 70 are formed of ferrites, the entire contact surface 84 constituted by exposed edge surfaces of the ferrite layers has a substantially uniformly high strength and resistance to wear while desirably restricting the erasing action to the width of the magnetic tape that corresponds to the width of magnetized layer 82.

As indicated schematically on FIG. 7, the layer 82 of a ferrite having a high magnetic coercive force is magnetized so that its edge surface **82*a* presents a series or succession of alternately arranged opposed poles at locations along such edge surface, with the strength of the magnetization decreasing progressively along such series of poles in the direction of relative movement of the tape 15. Thus, the magnetization has a maximum strength at the end 86 of surface 82*a* first encountered by track 80 on tape 15 and decreases to zero at the other end 87 of edge surface 82*a*. Accordingly, as the tape 15 is moved relative to head 70 in the direction 85, the signals recorded in track 80 of the tape will be erased by a magnetic field which alternates and is of decreasing strength, so that the erasing action will be similar to that achieved with an alternating current erasing head. Although the head 70 has been described as erasing only the signals recorded in track 80 of tape 15, it is apparent that inverting of cassette 13, and hence of the tape, to bring the edge surface 82*a* of magnetized layer 82 into alignment with the other track 81 of the tape will then make it possible for the head to erase only signals recorded in the track 81 while leaving undisturbed the signals recorded in the first mentioned track 80. Thus, the head 70 is obviously adapted for the selective erasing of magnetic signals recorded in one or the other of the two tracks 80 and 81 on tape 15.**

It will be apparent that, when head holder 71 is free to be urged by spring 73 to the position of FIGS. 3, 6, 8 and 9 relative to bracket 61, the head holder 71 and head 70 move with carriage 47 between the operative position (FIG. 8) and inoperative position (FIG. 3) of the carriage. With carriage 47 moved to its operative position (FIG. 8) and head holder 71 free to move with the carriage while maintained against stop surface **64*a*, the permanently magnetized head 70 also extends through window 14B immediately adjacent tape guide 63 and has its surface 84 in contact with tape 15. However, if head holder 71 and head 70 are blocked or held against movement with carriage 47 when the latter is moved to its operative position (FIG. 10), then head holder 71 pivots about pin 72 in the clockwise direction relative to bracket 61 and erasing head 70 is held away from cassette 13 as tape guide 63 enters window 14B to engage tape 15** and stabilize the movement of the latter.

In order to block the movement of erasing head 70 with carriage 47 in the direction toward the operative position of the carriage, the apparatus according to this invention is further shown to have a blocking lever 90 which is pivoted intermediate its ends on a pin 91 carried by chassis 34 at the outer side of bracket 61. One arm 92 of blocking lever 90 extends from pivot pin 91 above erasing head holder 71 and has its end portion disposed in back of an abutment 74 projecting upwardly from head holder 71. The other arm 93 of lever 90 is directed laterally outward from pivot pin 91 and then downwardly through a slot 94 provided in chassis 34. An actuating or control lever 95 (FIG. 4) is disposed underneath chassis 34 and is pivotally mounted, intermediate its ends, on a pivot pin **95*a* depending from the chassis. One end portion 96 of actuating lever 95 is disposed in back of a substantially vertical surface portion 97 on pushbutton 6 below the pivoting axis of the latter defined by shaft 31, and the other end portion 98 of actuating lever 95 extends in back of the free end of arm 93 of blocking lever 90. It will be apparent that, when pushbutton 26 is depressed, its surface 97 acts rearwardly on end portion 96 of lever 95 so that the opposite end portion 98 of the actuating lever is moved forwardly against the end of arm 93 of lever 90. Actuating lever 90 is urged by a spring 100 in the clockwise direction to the position shown on FIGS. 3 and 10 where arm 93 engages a stop pin 99 and at which arm portion 92 of the blocking lever is in the path of the rearward movement of abutment 74 on head holder 71. Further, the spring 100 exerts a force on blocking lever 90 that is sufficiently large to overcome the force of the spring 73 acting on head holder 71 when the rearward movement of holder 71 with carriage 47 is blocked by the engagement of blocking lever arm 92 with abutment 74.**

The above described magnetic recording and reproducing apparatus 10 according to this invention operates as follows:

When it is desired to select the recording mode of operation of apparatus 10, pushbuttons 26 and 28 of control assembly 25 are simultaneously depressed. The depressing of pushbutton 28 causes rearward movement of carriage 47 from its inoperative position (FIG. 3) to its operative position (FIG. 8) and latch member 37 acts to retain pushbutton 28 in its depressed position. As a result of the rearward movement of carriage 47 to its operative position, recording and reproducing head 53 is inserted into the central window 14C of cassette housing 14 and engages tape 15 against the resilient backup pad 14H. The rearward movement of carriage 47 to its operative position further causes the insertion of pinch roller 56 into window 14D for engagement with the tape 15 against rotated capstan 21 and driving of the tape therebetween. The simultaneously depressed pushbutton 26 is also retained in its depressed condition by latch member 37 and turns actuating lever 95 to the position indicated in broken lines on FIG. 8 where the end 98 of lever 95 acts forwardly against arm 93 of blocking lever 90 to turn the latter in the counterclockwise direction against the force of spring 100. By reason of such turning of lever 90, arm 92 is moved rearwardly away from abutment 74 on head holder 71 so that spring 73 can maintain holder 71 against stop surface **64*a* with permanently magnetized erasing head 70 positioned immediately adjacent the tape guide 63 on arm 64, as shown on FIG. 8. With head 70 maintained immediately adjacent tape guide 63 during the rearward movement of carriage 47 to its operative position, both head 70 and tape guide 63** enter window 14B and engage the portion of the tape 15 there exposed. As a result of the simultaneous depression of pushbuttons 26 and 28, conventional electric circuits (not shown) are controlled to cause operation of head 53 for the recording of signals on tape 15, and the driving of capstan 21 and reel drive shaft 23A to effect transport of tape 15 in the direction of arrow 85 on FIG. 8 and to wind the tape on the takeup reel associated with reel drive shaft 23A. It will be apparent that, during such transport of the tape, tape guide 63 is engaged with the tape 15 immediately adjacent permanently magnetized erasing head 70 so as to prevent undulation or waving of the tape in the fore and aft direction and further to prevent jumping of the tape in the vertical direction. During such stabilized transport of the tape 15, the permanently magnetized erasing head 70 acts to remove any signals previously recorded on the tape 15 in advance of the movement of the tape past head 53 by which the new signals are recorded on the tape.

When it is desired to halt a recording operation of apparatus 10, pushbutton 29 is depressed so that, as previously described, latch member 37 is moved to its released position and pushbuttons 26 and 28 are thereby freed for return to their inoperative positions. As shown on FIG. 3, the return of pushbutton 28 to its inoperative position permits spring 50 to return carriage 47 forwardly to its inoperative position in which head 53, pinch roller 56 and tape guide 63 on bracket 61 are all withdrawn from the respective windows of the cassette. The return of pushbutton 26 to its inoperative position permits spring 100 to return blocking lever 90 to the position shown on FIG. 3 where arm 93 engages stop pin 99.

When it is desired to select the reproducing mode of operation of apparatus 10, only pushbutton 28 is depressed (FIG. 10) for shifting carriage 47 rearwardly to its operative position, whereby head 53 and pinch roller 56 are respectively inserted into windows 14C and 14D of the cassette 13. When only pushbutton 28 is depressed, the associated control circuits (not shown) again cause capstan 21 and takeup reel shaft 23A to be rotated for transporting tape 15 in the direction of arrow 85, and head 53 is now operated for reproducing the signals previously recorded on the transported tape. Since pushbutton 26 is not depressed, control lever 95 remains in its inoperative position, as shown on FIGS. 3 and 10, whereby spring 100 strongly retains arm 93 of blocking lever 90 against stop pin 99 and arm 92 of the blockimg lever then blocks rearward movement of abutment 74 with carriage 47. Since the rearward movement of abutment 74 with carriage 47 is blocked by arm 92 of lever 90, the rearward movement of carriage 47 causes holder 71 to be turned in the clockwise direction relative to bracket 61 about pivot pin 72 against the force of spring 73, for example, to the position shown on FIG. 10. Thus, during the reproducing mode of operation, only tape guide 63 of assembly 60 enters window 14B for stabilizing the movement or transport of the tape 15 during the reproducing of the signals thereon by head 53, and the permanently magnetized erasing head 70 is maintained, by arm 92, at a position substantially spaced from the tape 15 so as to avoid any erasing or damage to the recorded signals which are to be reproduced.

Of course, when either of the pushbuttons 27 and 30 is depressed to effect the fast forward movement or the fast rewinding, respectively, of the tape, the carriage 47 remains in its forward, inoperative position, as is usual in an apparatus of the described type, and the fast forward or fast rewinding movement of the tape is effected merely by the relatively high speed rotation of one of the reel drive shafts 23A and 24A in a suitable direction.

Figure 11:
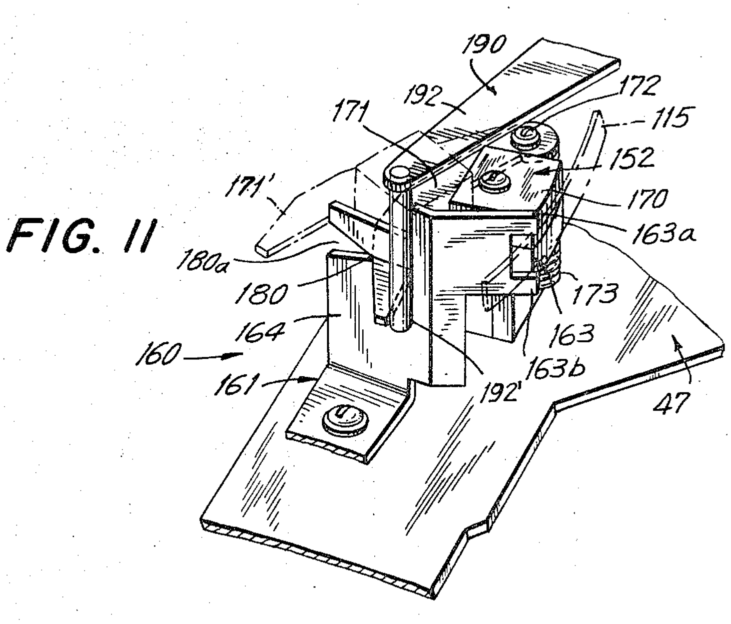
FIG. 11 is a perspective view showing the assembly of an erasing head and a tape guide according to another embodiment of this invention.

Referring now to FIG. 11, it will be seen that, in accordance with another embodiment of this invention, the previously described assembly 60 is replaced by an assembly 160 which includes a bracket 161 secured on the carriage 47 for movement with the latter and having an upstanding portion 164 provided with a rearwardly directed part defining a tape guide 163. The tape guide 163, as in the case of the previously described guide 63, has spaced apart upper and lower projections **163*a* and 163*b* between which there extends a straight tape contact surface 163*c*. The assembly 160 further includes an erasing head means 152 made up of a permanently magnetized erasing head 170 similar to the previously described head 70, and a holder 171 to which the head 170 is suitably secured. In this case, the holder 171 is in the form of an elongated arm pivotally mounted, at one end, on a post 172 extending upwardly from carriage 47 and being swingable about such post 172 between an operative position shown in full lines on FIG. 11 and an inoperative position indicated in broken lines on 171'. The arm 171 is urged to its operative position by a torsion spring 173 on post 172 and, in such operative position, the free end portion of arm 171 is engaged in a slot 180 formed in the upstanding portion 164 of bracket 161 and opening at the forward edge of the latter. It will be apparent that, when arm 171 engages the closed forward end of slot 180, such engagement accurately establishes the operative position of erasing head 170 relative to tape guide 163. Further, the close engagement of arm 171 in slot 180 serves to stabilize the position of arm 171, and hence of erasing head 170 to prevent rocking of the latter relative to the axis of the pivot or post 172. Slot 180 is shown to have a widened forward or open end portion 180*a* for facilitating the entry of arm 171 into the guiding slot 180**.

The movements of erasing head 170 relative to tape guide 163 are controlled in a manner similar to that previously described with reference to the assembly 60. Thus, in FIG. 11, the movements of head holder arm 171 are controlled by a blocking lever 190 which corresponds to the previously described blocking lever 90 and which has a pin 192' depending from the end of its arm 192 in back of the free end portion of arm 171. When the recording mode of operation is selected, blocking lever 190 is turned to a position corresponding to the position of blocking lever 90 shown on FIG. 8 so that pin 192' will not interfere with or block the rearward movement of the end portion of arm 171 with bracket 161 on carriage 47. Thus, erasing head 170 will remain immediately adjacent tape guide 163 and be inserted with the latter into a common window of the cassette. However, upon selection of the reproducing mode of operation, blocking lever 190 occupies a position similar to that shown for the blocking lever 90 on FIG. 10 so that, as bracket 161 moves rearwardly with carriage 47 to insert tape guide 163 into a window of the cassette, depending pin 192' of blocking lever 190 blocks the movement of arm 171 so that the latter occupies the position shown in broken lines at 171' relative to bracket 161. Thus, the permanently magnetized erasing head 170 is then spaced from tape guide 163 to avoid erasing of signals on the tape 115 during the reproducing operation.

In each of the above described embodiments of this invention, the permanently magnetized erasing head 70 or 170 has been mounted on a holder 71 or 171 which is pivoted for movement with respect to the bracket 61 or 161 having the tape guide 63 or 163 formed thereon. However, it should be noted that the holder of the erasing head can be mounted for rectilinear sliding movement in the fore and aft direction relative to the bracket on which the tape guide is provided. Further, in the illustrated embodiments described above, a single head 53 is provided for both recording and reproducing signals on the tape 15 or 115. However, if desired, individual, alternatively operative heads can be provided for performing the recording and reproducing functions, respectively. Although the invention is particularly advantageously applied to magnetic recording and reproducing apparatus for use with tape cassettes in which stabilizing of the tape movement is especially a problem, the invention can also be applied to magnetic recording and reproducing apparatus of the type using open reels.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. A magnetic tape recording and reproducing apparatus comprising tape drive means for transporting a magnetic tape at least in one direction along a predetermined path during recording and reproducing operations of the apparatus, magnetic recording and reproducing head means engageable with the tape in said path during said operations of the apparatus, tape guide means fixedly located in respect to said magnetic recording and reproducing head means in advance of the latter considered in said one direction of tape transport along said path, said tape guide means being engageable with the tape in said path during said recording and reproducing operations and having a tape contact surface with a straight generatrix to extend across the tape and a pair of projections spaced apart by said surface therebetween and extending beyond said surface for contact with opposite edges of the tape, permanently magnetized erasing head means disposed immediately adjacent said tape guide means and having a tape contact surface, means mounting said erasing head means for movement relative to said tape guide means and relative to said recording and reproducing head means between a first position, in which said tape contact surface of the erasing head means extends at least as far as said tape contact surface of the tape guide means in the direction toward said path, and a second position, in which said tape contact surface of the erasing head means is retracted relative to said tape contact surface of the tape guide means in the direction away from said path, and control means for said erasing head means disposing the latter in said first position during said recording operation of the apparatus and disposing said erasing head means in said second position during said reproducing operation of the apparatus.

2. A magnetic tape recording and reproducing apparatus according to claim 1, in which said erasing head means includes at least one layer of barium ferrite which is permanently magnetized to present a series of alternately opposed magnetic poles at locations along said tape contact surface of the erasing head means, and in which the strength of the magnetization decreases progressively along said series of poles in said one direction of tape transport.

3. A magnetic tape recording and reproducing apparatus according to claim 1, in which said tape guide means are formed on a mounting bracket, and said means mounting said erasing head means are engageable with said mounting bracket for precisely locating said erasing head means relative to said tape guide means.

4. A magnetic tape recording and reproducing apparatus according to claim 3, in which said means mounting said erasing head means include a pivot for the latter carried by said mounting bracket and about which said erasing head means is swingable between said first and second positions.

5. A magnetic tape recording and reproducing apparatus according to claim 4, in which said mounting bracket has a stop surface integral with said tape contact surface and projections of the tape guide means and engageable by said erasing head means for limiting the movement of the latter to said first position.

6. A magnetic tape recording and reproducing apparatus according to claim 3, in which said means mounting said erasing head means includes a pivot pin fixed relative to said mounting bracket and an arm swingable, at one end, on said pivot pin and carrying said erasing head means, and in which said mounting bracket has a slot slidably engaged by the other end portion of said arm, at least when said erasing head means is in said first position, for the precise locating of said erasing head means relative to said tape guide means.

7. A magnetic tape recording and reproducing apparatus according to claim 6, in which said slot has a flared entry portion at which said arm enters said slot during movement of said erasing head means from said second position to said first position.

8. A magnetic tape recording and reproducing apparatus comprising tape drive means for transporting a magnetic tape at least in one direction along a predetermined path during recording and reproducing operation of the apparatus, a carriage moved transverse to said path from an inoperative position to an operative position during said recording and reproducing operations, magnetic recording and reproducing head means fixed on said carriage and engaging the tape in said path when said carriage is in said operative position, tape guide means also fixed on said carriage and engaging the tape in said path at a location in advance of said recording and reproducing head means considered in said one direction of tape transport when said carriage is in said operative position for stabilizing the transport of the tape by said drive means, permanently magnetized erasing said head means disposed immediately adjacent said tape guide means on said carriage, means mounting said erasing head means for movement relative to said tape guide means generally in the direction of the carriage movement between a first position in which, with said carriage in said operative position, said erasing head means contacts the tape in said path for erasing signals recorded on said tape, and a second position in which, with said carriage in said operative position, said erasing head means is spaced from said path in the direction toward said inoperative position of the carriage, and control means for said erasing head means disposing the latter in said first position during said recording operation of the apparatus and disposing said erasing head means in said second position during said reproducing operation of the apparatus.

9. A magnetic tape recording and reproducing apparatus according to claim 8, in which said tape guide means has a tape contact surface with a straight generatrix to extend across the tape and a pair of projections spaced apart by said tape contact surface therebetween and extending beyond said surface for contact with opposite edges of the tape, and in which said erasing head means has a tape contact surface which, in said first position, extends at least as far as said tape contact surface of the tape guide means in the direction toward said path and, in said second position, is retracted relative to said tape contact surface of the tape guide means in the direction away from said path.

10. A magnetic tape recording and reproducing apparatus according to claim 8, in which said erasing head means includes at least one layer of barium-ferrite which is permanently magnetized to present a series of alternately opposed magnetic poles at locations along a tape contact surface of the erasing head means, and in which the strength of the magnetization decreases progressively along said series of poles in said one direction of tape transport.

11. A magnetic tape recording and reproducing apparatus according to claim 8, in which said tape guide means are formed on a mounting bracket secured to said carriage, and said means mounting said erasing head means are engageable with said mounting bracket for precisely locating said erasing head means relative to said tape guide means.

12. A magnetic tape recording and reproducing apparatus according to claim 11, in which said means mounting said erasing head means includes a pivot for the latter carried by said mounting bracket and about which said erasing head means is swingable between said first and second positions.

13. A magnetic tape recording and reproducing apparatus according to claim 12, in which said mounting bracket has a stop surface integral with said tape guide means and engageable by said erasing head means for limiting the movement of the latter to said first position.

14. A magnetic tape recording and reproducing apparatus according to claim 11, in which said means mounting said erasing head means includes a pivot pin fixed relative to said mounting bracket and an arm pivoted, at one end, on said pin and having said erasing head means secured on said arm, and in which said mounting bracket has guide means engageable by the other end portion of said arm, at least when said erasing head means is in said first position for the precise locating of said erasing head means relative to the tape guide means.

15. A magnetic tape recording and reproducing apparatus according to claim 8, in which said control means includes spring means yieldably urging said erasing head means to said first position thereof, blocking means normally operative to block the movement of said erasing head means with said carriage in the direction toward said operative position of the carriage for displacing said erasing head means to said second position in response to such movement of said carriage, and means rendering said blocking means inoperative upon the selection of said recording operation of the apparatus.

16. An apparatus for magnetically recording and reproducing signals on a magnetic tape contained in a cassette including an edge wall having windows therein past which a run of the tape is guided for exposure at the windows, said apparatus comprising a chassis having means for locating the cassette thereon, a carriage on said chassis carrying magnetic recording and reproducing head means and being movable relative to said chassis between an operative position for recording and reproducing operations of the apparatus, where said recording and reproducing head means enters at least one of the windows of said cassette for engagement with said run of the magnetic tape, and an inoperative position where said recording and reproducing head means is spaced from the cassette, tape guide means fixed on said carriage and disposed to extend through another of the cassette windows into engagement with said tape run for stabilizing movement of the tape along said run when said carriage is in said operative position thereof, permanently magnetized erasing head means disposed adjacent said tape guide means on said carriage in advance of said recording and reproducing head means considered in the direction of tape movement, means mounting said erasing head means for movement relative to said tape guide means between a first position in which, with said carriage in said operative position, said erasing head means extends through said other window and contacts the tape in said run for erasing signals recorded on the tape, and a second position in which, with said carriage in said operative position, said erasing head means is spaced from the cassette in the direction toward said inoperative position of the carriage, and control means for said erasing head means disposing the latter in said first position during said recording operation of the apparatus and disposing said erasing head means in said second position during said reproducing operation of the apparatus.

17. An apparatus according to claim 16, in which said tape guide means has a tape contact surface with a straight generatrix to extend across the tape and a pair of projections spaced apart by said tape contact surface therebetween and extending beyond said surface for contact with opposite edges of the tape, and in which said erasing head means has a tape contact surface which, in said first position, extends at least as far as said tape contact surface of the tape guide means in the direction toward said tape run and, in said second position, is retracted relative to said tape contact surface of the tape guide means in the direction away from said tape run.

18. An apparatus according to claim 16, in which said erasing head means includes at least one layer of barium-ferrite which is permanently magnetized to present a series of alternately opposed magnetic poles at locations along a tape contact surface of the erasing head means, and in which the strength of the magnetization decreases progressively along said series of poles in the direction of tape movement.

19. An apparatus according to claim 16, in which said tape guide means are formed on a mounting bracket secured to said carriage, and said means mounting said erasing head means are engageable with said mounting bracket for precisely locating said erasing head means relative to said tape guide means.

20. An apparatus according to claim 19, in which said means mounting said erasing head means includes a pivot for the latter carried by said mounting bracket and about which said erasing head means is swingable between said first and second positions.

21. An apparatus according to claim 20, in which said mounting bracket has a stop surface integral with said tape guide means and engageable by said erasing head means for limiting the movement of the latter to said first position.

22. An apparatus according to claim 19, in which said means mounting said erasing head means includes a pivot pin fixed relative to said mounting bracket and an arm pivoted, at one end, on said pin and having said erasing head means secured on said arm, and in which said mounting bracket has guide means engageable by the other end portion of said arm, at least when said erasing head means is in said first position for the precise locating of said erasing head means relative to the tape guide means.

23. An apparatus according to claim 16, in which said control means includes spring means yieldably urging said erasing head means to said first position thereof, blocking means normally operative to block the movement of said erasing head means with said carriage in the direction toward said operative position of the carriage for displacing said erasing head means to said second position in response to such movement of said carriage, and means rendering said blocking means inoperative upon the selection of said recording operation of the apparatus.

* * * * *